United States Patent Office 2,742,103
Patented Apr. 17, 1956

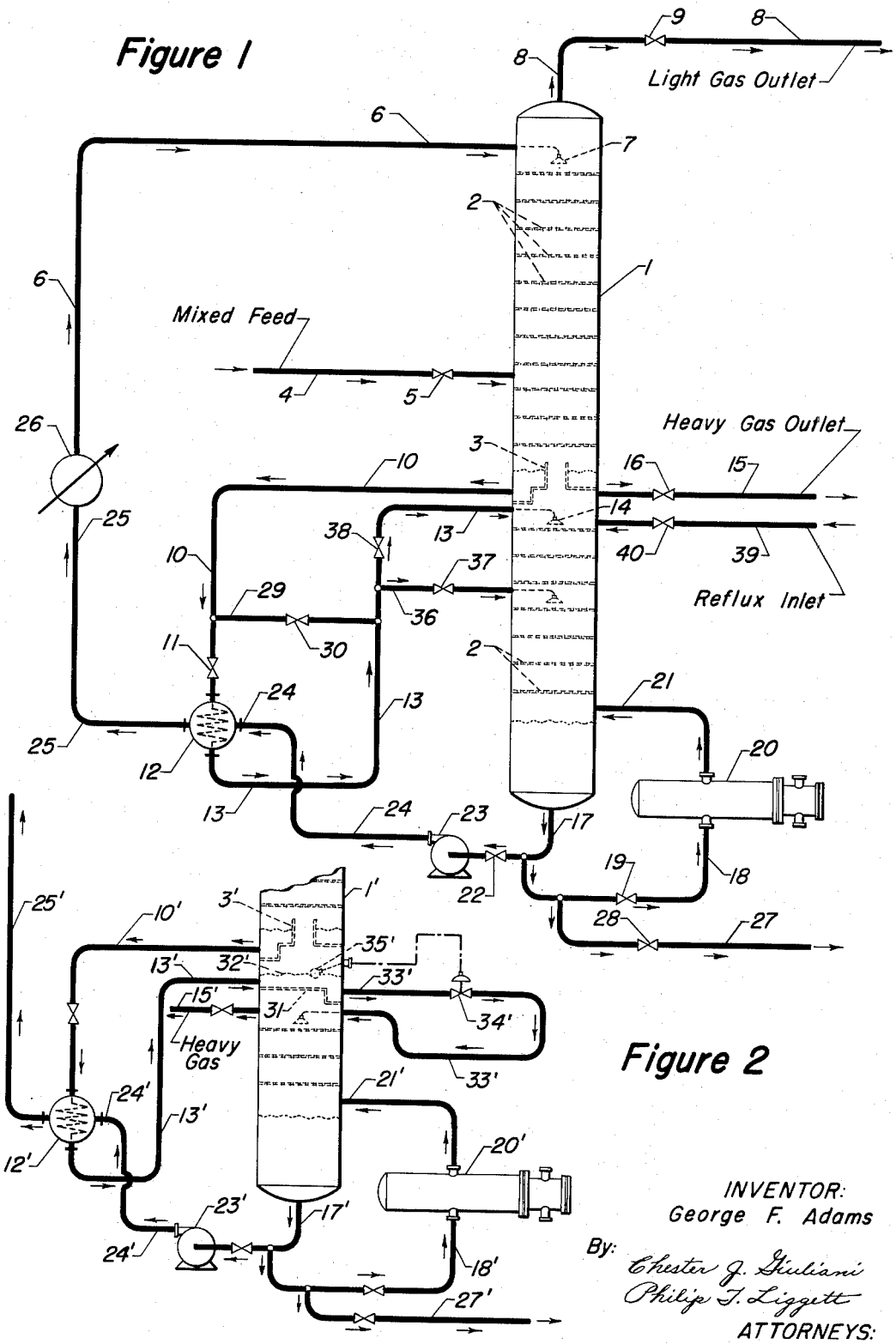

2,742,103

MEANS FOR SEPARATING A MIXED GASEOUS FEED STREAM

George F. Adams, Riverside, Ill., assignor to Universal Oil Products Company, Des Plaines, Ill., a corporation of Delaware Application July 7, 1953, Serial No. 366,495

7 Claims. (Cl. 183—2)

This invention relates to means for separating a mixed gaseous feed stream and more specifically to a method for separating light and heavy gaseous or vaporous fractions in a compact processing arrangement.

Various absorption methods and apparatus have been utilized in connection with the separation of vaporous and gaseous mixtures, with both solid and liquid materials being used as absorption mediums. However, in some instances, the apparatus and flow arrangements are such as to require two or more chambers, and the operation as well as the installation may be quite costly. The present invention provides an efficient single column system for effecting the separation of gaseous mediums and utilizes an absorption oil rather than a particulated material.

Briefly, the improved operation of this invention embodies a method for separating a mixed gaseous feed stream into light and heavy gaseous streams in a manner which comprises, introducing the stream intermediately into the upper portion of a vertically elongated fractionating and separating zone and passing a lean absorption oil downwardly countercurrently to the mixed gaseous stream in the upper portion of the zone, discharging an unabsorbed light gaseous fraction therefrom and collecting a resulting rich absorption oil with absorbed heavy fractions within an intermediate collecting well at a level spaced substantially below the feed stream inlet to said zone, passing the rich absorption oil stream in indirect heat exchange with the lean absorption oil prior to the latter passing to the upper portion of said zone and introducing the rich oil stream into said zone below the collecting well, effecting the heating and stripping of the rich absorption oil to remove a heavy gaseous fraction, discharging the heavy gaseous fraction from said zone and recycling stripped absorption oil from the lower end of said zone to the upper end thereof as the aforesaid lean absorption oil.

In effecting this type of operation, the upper portion of the elongated contacting zone provides an absorption-fractionation section where the heavier gaseous or vaporous fractions are separated and absorbed, while the intermediate portion of the zone, above the collecting well, provides a stripper section where light gases or vapors are removed from the absorption oil, or replaced by the heavier fractions. The lower portion of the zone below the collection well provides a section which is in communication with the upper portion of the zone, but functions as a heavy gas stripping section. Heat may be supplied to the lower end of the column by way of a heat exchanger or reboiler and the zones are integrated as to heat balance by passing stripped lean absorption oil from the lower portion of the separating zone in indirect heat exchange with the rich oil stream passing from the upper portion of the chamber to the lower portion, such that in effect the heat exchange effects a reboiler action for the upper absorber-stripper section. The resulting operation provides a separation of relatively light gaseous fractions which may be discharged from the upper end of the contacting zone while a heavier gaseous fraction is discharged as a sidecut stream from the column at a point intermediate between a stripper section for the light gases and a stripper section for the heavy gaseous fractions.

This single column process may, for example, be utilized to separate the lower molecular weight hydrocarbons from butane, pentane, and the heavier fractions resulting from various conversion processes. Also in connection with certain catalytic conversion operations the present method may be utilized to separate $H_2$, $H_2S$, $C_1$, and $C_2$ hydrocarbons from $C_3$ and $C_4$ hydrocarbons. For example, in effecting the catalytic reforming of a gasoline or naphtha stream to produce aromatic hydrocarbons and higher octane gasoline fractions, there is usually effected a net production of hydrogen, which is recycled in the reforming operation, and also the production of some $H_2S$, along with minor amounts of $C_1$, $C_2$, $C_3$, and $C_4$ hydrocarbons. The hydrogen and these relatively light fractions become separated from the hydrocarbon product stream in a receiving-separating zone following the reactors. This gaseous mixture which is recycled or the "net make" which is utilized as fuel gas may well be subjected to a gas separating operation such as provided by the present invention such that the $C_3$ and $C_4$ hydrocarbons may be recovered and not recycled with the hydrogen stream. It may be noted that an absorption method is a desirable means for recovering propane and butane fractions without retaining relatively large amounts of $H_2S$, with attendant problems of removal.

The single column apparatus arrangement as provided by the present invention may vary in minor details, but in one embodiment comprises in combination, a vertically elongated chamber having an upper gas contacting section and a lower heavy gas stripping section, liquid collecting and distributing means separating said sections with liquid conduit means connecting between the liquid collecting means and the upper portion of the lower heavy gas stripping section, a mixed gas inlet means connecting to an intermediate portion of the upper section, an absorption fluid inlet and a light gas outlet means connecting with the upper portion of the upper section of the chamber, heavy gas outlet means from the upper portion of the lower heavy gas stripping section and stripped fluid withdrawal means from the lower end of the latter section, conduit means connecting the stripped fluid withdrawal means with the aforesaid absorption fluid inlet means at the upper end of the chamber and providing for the recycling of the absorption medium, and heating means connecting with the lower end of the chamber suitable for heating the fluid medium therein.

It is a particular feature of a preferred embodiment of the present unitary apparatus arrangement to provide for heat exchange between the conduit means passing the rich absorption medium from the lower end of the upper section to the upper end of the lower section and the lean absorption medium passing by conduit means from the lower end of the chamber to the upper end of the chamber, such that the heated lean absorption medium provides heating, reboiling and stripping of the rich absorption medium prior to the reintroduction of the latter into the chamber. The liquid collecting section between the light gas stripping section and the heavy gas stripping section normally may comprise a center well arrangement whereby there is an open gas passageway means between the upper and lower section. However, where it is desired to operate the lower heavy gas stripping section at a different pressure than the upper light gas fractionating and absorption section, then a non-perforate "blind" tray may be utilized below and in combination with a center well arrangement to prevent any direct gas passageway between the two zones, while liquid is transferred by means of confined conduit or passageway means from the upper to the lower zones.

The operation of the liquid absorption system and the single column arrangement of the present invention, as well as advantages thereof, may be better explained and described by reference to the accompanying drawing and the following description thereof.

Figure 1 of the drawing is a diagrammatic elevational view of the gas separating method in a single column arrangement.

Figure 2 of the drawing indicates diagrammatically a modification which may be made in connection with the lower portion of a single column arrangement whereby there is no direct gas or vapor communication between upper and lower sections such that different operating pressures may be maintained in the separation sections.

Referring now to Figure 1 of the drawing, there is shown a vertically elongated chamber 1 having a plurality of spaced vapor-liquid contacting trays 2 extending throughout substantially the full height of the column. The lower portion of the column, below a collecting well 3 provides a stripping section for the heavier gaseous fractions while the portion above the well provides a heavy gas absorption and light gas stripping section. The mixed gas feed stream is introduced into the intermediate portion of the upper section of column 1 by way of line 4 and valve 5 while absorption oil is introduced into the top end of the column by means of line 6 and distributor head or spray nozzle 7. The lean absorption oil passes downwardly over decks or trays 2 countercurrently to the gaseous or vaporous stream introduced in line 4 and effects the absorption of the heavier gaseous fractions prior to reaching the liquid collecting zone at the center well 3. The unabsorbed light gaseous fractions are discharged from the upper end of column 1 by means of outlet line 8 and valve 9.

Rich absorption oil is discharged from the liquid collecting section of center well 3 by way of line 10 and valve 11 to pass through a heat exchanger 12 and line 13 which carries the heated material back into the column 1, below the center well 3, and to distributing nozzle 14. The rich absorption oil passes downwardly through this lower heavy gas stripping portion of column 1 countercurrently to heavy gases being stripped from the absorption oil. The heavy gases are discharged from the chamber by way of line 15 and a valve 16. The stripped lean absorption oil collects in the lower end of column 1 and is discharged by way of line 17, with a portion passing by way of line 18 and valve 19 through reboiler 20 and line 21 back into the column 1. The major portion of the absorption oil passes by way of valve 22, pump 23, line 24 and the heat exchanger 12 to line 25 and line 6 where it re-enters the upper end of the column 1 as the lean absorber oil. A cooler 26 is indicated in the drawing intermediate lines 25 and 26 so as to provide additional cooling and heat control of the recycled absorption oil in the stream. The line 27 and valve 28 communicating with line 18 provide means for discharging absorption oil from the system. Also, a by-pass line 29 and control valve 30 provide means for passing a rich absorption oil from line 10 directly into the lower portion of column 1, without passing through heat exchanger 12 so that if desired a portion of the rich oil may pass directly to the lower end of the zone and there is substantially complete control means for maintaining a desired temperature in reboiling the rich oil medium.

Still another modification permits liquid reflux to be returned to the lower stripping section to provide fractionation between the absorption oil and the heavy vaporous fraction being withdrawn therefrom. In other words, the rich absorption oil may be charged to the column at a lower level through line 36 and valve 37, with valve 38 being closed, while reflux is charged to the top tray of the lower section through line 39 and valve 40. This arrangement permits the use of a lower boiling absorption oil without excessive losses to the vapor stream being withdrawn at line 15.

Referring to Figure 2 of the drawing, there is shown a modified column 1' having a collecting zone and center well 3' so that rich absorption oil may be discharged from the absorption and stripping zone by way of line 10', pass through heat exchanger 12' and be introduced back into the column by way of conduit 13'. There is provided in this embodiment a non-perforate blind tray 31 which is spaced below the center well 3' such that a liquid level is maintained, as indicated by the broken line 32. The rich absorption oil with the absorbed heavier gaseous fractions passes from above the blind tray 31 by means of a conduit 33, having valve 34, and into the lower confined heavy gas stripping section, with fluid flow being regulated by means of a level controller 35.

As in connection with the embodiment of Figure 1, the heavy gaseous fraction is stripped from the rich absorption oil and is discharged by way of an outlet line 15', while stripped lean oil is discharged from the lower end of the column by way of line 17'. This latter stream is recycled by way of pump 23', line 24', heat exchanger 12', and line 25'. A controlled portion is passed through reboiler 20' also as set forth in connection with Figure 1 of the drawing. It may be seen that in this arrangement, there is no direct gas passageway between the heavy gas stripping section and the intermediate and upper portions of the column, where the light gases are fractionated and stripped from the heavier gaseous fractions, so that where it is desired, for heat balance purposes, a different pressure may be maintained in the lower section.

By way of a more specific example of the utility of the present separating method, propane and butane may be separated and recovered from the light gaseous stream, which consists primarily of hydrogen that is in turn separated from a catalytically reformed product stream and normally recycled to the reactor section to maintain a high $H_2$ concentration. The product stream or reformate from the reactor section of the catalytic unit is cooled to a temperature of the order of about 100° F. and introduced into a separator-receiver tank. The liquid product stream comprising high octane gasoline is debutanized and stabilized and subsequently sent to storage for blending purposes. The gaseous stream comprising primarily hydrogen, together with some hydrogen sulfide, methane, ethane, propane, and butane is charged to an absorber-fractionator system as shown in Figure 1 of the drawing at a temperature of the order of about 100° F. The upper portion of the column 1 receives a lean absorption oil, such as a naphtha boiling in the range of from about 300° F. to about 400° F. by way of line 6. This lean absorption oil passes downwardly through the upper section of the column 1 countercurrently to the mixed gaseous feed stream and effects the absorption of primarily the $C_3$ and $C_4$ fractions, permitting the hydrogen, $H_2S$ and $C_1$ and $C_2$ fractions to be discharged from the upper end of the column by way of line 8. In a catalytic reforming unit, this hydrogen containing gaseous stream may be subjected to $H_2S$ removal in a Girbotol unit, or similar process, and recycled to the inlet end of the reforming section.

The rich absorption oil, that is the oil containing the $C_3$ and $C_4$ fractions, passes from column 1 by way of line 10 and is heated in exchanger 12 to a temperature of about 220° F. prior to entering the lower heavy gas stripping section of the column. The rich oil stream is fractionated and stripped in the lower section of the column, undergoing heating by means of reboiler 20. Steam or other hot fluid medium is passed in indirect heat exchange with the absorption oil in reboiler 20 to maintain a temperature of the order of about 600° F. and effect the substantially complete stripping and removal of the $C_3$ and $C_4$ fractions by way of the heavy gas outlet line 15. The stripped lean absorption oil at a temperature of about 600° F. is withdrawn from the lower end of the column 1 by way of lines 17 and 24 and passes in indirect heat exchange with the rich oil stream at exchanger 12 and through cooler 26 as hereinbefore described. The lean absorber oil is thus cooled from about 600° F. to about 100° F. by virtue of the heat exchange and cooler arrangement and provides a cool absorbing oil for the upper light gas absorption section of the column by passing through line 6 and distributing nozzle 7.

The mixed gaseous feed stream passing from the catalytic reforming receiver zone is normally at a relatively high atmospheric pressure of the order of 500 to 700 p. s. i. g. so that if it is desired to effect only a minimum pressure reduction in effecting the $C_3$ and $C_4$ absorption and recovery process, then the confined absorption and stripping operation of the present invention may be effected at a similar high pressure. However, the present operation may be carried out at atmospheric or low super-atmospheric pressures where it is desirable, for better absorption efficiency. Also, as set forth hereinbefore, in connection with the description of the drawing, the embodiment of Figure 2 of the drawing may be utilized to permit different pressures in the upper and lower sections of the column.

Another modification of the operation in connection with the foregoing example, where $C_3$ and $C_4$ hydrocarbons are recovered from the hydrogen recycle stream of a catalytic reforming unit, provides that a portion of the recovered $C_3$ and $C_4$ liquid stream may be refluxed in a liquid stream to the absorber fractionating column by reintroducing the latter stream at the point of $C_3$—$C_4$ vapor withdrawal to thus provide a fractionated separation between the $C_3$—$C_4$ and the rich absorption oil being introduced into the lower end of the column. Thus, as mentioned in connection with the description of Figure 1 of the drawing, the rich oil is passed from line 13 through line 36 and valve 37 to the stripping section, while the liquid $C_3$—$C_4$ reflux is introduced through line 39.

I claim as my invention:

1. A gas separating apparatus comprising a vertically elongated chamber, a liquid collecting well at an intermediate point in the height of the chamber and dividing the latter into an upper gas contacting section and a lower heavy gas stripping section, a gas inlet connected to said upper section intermediate the top of the chamber and said collecting well, an absorption liquid inlet and a light gas outlet connected to the upper portion of the upper section at a higher elevation than said gas inlet, a heavy gas outlet from the upper portion of said lower section, means for removing liquid from said collecting well and for introducing the same to the upper portion of the lower section, a liquid outlet at the lower end of said lower section and conduit means connecting same with said absorption liquid inlet, and means for heating the lower end of said chamber.

2. A gas separating apparatus comprising a vertically elongated chamber, a liquid collecting well at an intermediate point in the height of the chamber and dividing the latter into an upper gas contacting section and a lower heavy gas stripping section, a gas inlet connected to said upper section intermediate the top of the chamber and said collecting well, an absorption liquid inlet and a light gas outlet connected to the upper portion of the upper section at a higher elevation than said gas inlet, a heavy gas outlet from the upper portion of said lower section, a heat exchanger, means for passing liquid from said collecting well through said heat exchanger and into the upper portion of said lower section, means for passing liquid from the lower end of the lower section through the heat exchanger to said absorption liquid inlet, and means for heating the lower end of said chamber.

3. An improved method for separating a mixed gaseous feed stream into light and heavy gaseous fractions which comprises, introducing said feed stream intermediately into the upper portion of a vertically elongated fractionating and separating zone and passing a lean absorption oil downwardly countercurrently to said mixed gas stream in the upper portion of said zone, discharging an unabsorbed light gaseous fraction from the upper portion of said zone and collecting the resulting rich absorption oil containing the heavier fractions within a collecting well at a level spaced substantially below the feed stream inlet to said zone, withdrawing the collected rich absorption oil and passing it in indirect heat exchange with hot lean absorption oil and introducing said rich oil stream into said zone below said collecting well, maintaining a level of the heated rich absorption oil below said collecting well and in open communication with the upper portion of said zone, withdrawing regulated amounts of the rich absorption oil and introducing it into the lower separated portion of said zone and effecting the heating and stripping of the rich oil stream to remove a heavy gaseous fraction, discharging said heavy gaseous fraction from the latter separated portion of said zone and recycling a heated stripped absorption oil from the lower end of said zone to the upper end thereof as the aforesaid lean absorption oil.

4. A unitary apparatus for fractionating and separating mixed gaseous fractions, which comprises in combination, a vertically elongated chamber having an upper gas contacting section and a lower heavy gas stripping section, liquid collecting and distributing means separating said section and liquid conduit means connecting between said liquid collecting means and the upper portion of said lower stripping section, a mixed gas inlet means connecting to the intermediate portion of said upper section, an absorption fluid inlet and a light gas outlet means connecting to the upper portion of the upper section of said chamber, heavy gas outlet means from the upper portion of said lower section of said chamber, and stripped fluid withdrawal means from the lower end of the latter section, with conduit means connecting said stripped fluid withdrawal means with the aforesaid absorption fluid inlet means at the upper end of said chamber suitable for recycling the absorption medium, and heating means connecting with the lower end of said chamber suitable for heating the fluid medium therein.

5. The apparatus of claim 4 further characterized in that both the upper and lower sections of said separating and fractionating apparatus have vapor-liquid contacting means positioned throughout a substantial portion of the height thereof.

6. The apparatus of claim 4 further characterized in that said liquid conduit means connecting between the liquid collecting means and the upper portion of said lower stripping section passes in indirect heat exchange with the conduit means connecting the stripped fluid withdrawal means from the lower end of the lower section and passing to the upper absorption fluid inlet means.

7. The apparatus of claim 4 further characterized in that said liquid collecting and distributing means comprises a partially open liquid collecting well and a non-perforate plate spaced therebelow whereby a level of heated liquid may be maintained between said upper and lower sections, liquid conduit means connecting from above said collecting well passing exteriorly from said chamber and returning to and connecting with the space between said collecting well and said non-perforate plate, additional conduit means connecting from above said non-perforate plate to the lower section of said chamber directly below said plate and flow control means connecting therewith, whereby there is no direct gas and vapor communication between the upper and lower sections of said chamber.

References Cited in the file of this patent

UNITED STATES PATENTS

| | | |
|---|---|---|
| 1,900,655 | Metzger | Mar. 7, 1933 |
| 2,498,177 | Nelly, Jr. | Feb. 21, 1950 |
| 2,519,344 | Berg | Aug. 22, 1950 |
| 2,596,785 | Nelly, Jr., et al. | May 13, 1952 |
| 2,638,437 | Ragatz | May 12, 1953 |